(12) United States Patent
Noilhan

(10) Patent No.: US 6,844,050 B2
(45) Date of Patent: Jan. 18, 2005

(54) PRECUT PLATE FOR OBTAINING A VOLUME, IN PARTICULAR A PACKAGE, METHOD FOR MAKING SAME AND RESULTING PACKAGE

(75) Inventor: Roland Noilhan, Toulouse (FR)

(73) Assignee: P.W.F. Group, Toulouse (FR)

( * ) Notice: Subject to any disclaimer, the term of this patent is extended or adjusted under 35 U.S.C. 154(b) by 0 days.

(21) Appl. No.: 10/312,539

(22) PCT Filed: Jun. 29, 2001

(86) PCT No.: PCT/FR01/02089

§ 371 (c)(1),
(2), (4) Date: Dec. 27, 2002

(87) PCT Pub. No.: WO02/00424

PCT Pub. Date: Jan. 3, 2002

(65) Prior Publication Data

US 2004/0076800 A1 Apr. 22, 2004

(30) Foreign Application Priority Data

Jun. 29, 2000 (FR) .............................................. 00 08381

(51) Int. Cl.$^7$ .............................. B32B 3/00; B32B 1/08; B32B 31/00
(52) U.S. Cl. ....................... 428/172; 428/34.2; 428/109; 428/137; 428/167; 428/537.1; 428/542.8; 156/219; 156/227; 156/268
(58) Field of Search ................................ 428/167, 172, 428/99, 106, 537.1, 137, 34.2, 109, 121, 130, 542.8; 156/219, 227, 218, 257, 268

(56) References Cited

U.S. PATENT DOCUMENTS

| 1,881,734 | A | | 10/1932 | Lewis |
| 2,505,789 | A | * | 5/1950 | Norquist ....................... 52/631 |
| 3,969,868 | A | * | 7/1976 | Bainter et al. .............. 428/201 |
| 4,533,588 | A | * | 8/1985 | Kraft ........................... 428/167 |

FOREIGN PATENT DOCUMENTS

| EP | 0 187 119 | 7/1986 |
| EP | 0 641 905 | 3/1995 |
| EP | 0 893 243 | 1/1999 |
| FR | 2 779 089 | 12/1999 |
| GB | 1 583 324 | 1/1981 |

* cited by examiner

*Primary Examiner*—Donald J. Loney
(74) *Attorney, Agent, or Firm*—Young & Thompson

(57) ABSTRACT

A precut plate for defining an assembly of plate parts is capable of taking at least first and second shapes. A first flat shape, wherein the plate as a whole is substantially in a plane and a second folded shape, obtained after folding about hinge parts of the plate one relative to the others to define a hollow volume, for example all or part of a package for products. The plate includes at least three layers stacked on one another. The second layer located between the first and the third layer is a flexible material layer, at least the first of the two first and third layers being a relatively rigid layer. The invention also concerns the resulting volume or package, and the method for making the plate.

15 Claims, 2 Drawing Sheets

PRECUT PLATE FOR OBTAINING A VOLUME, IN PARTICULAR A PACKAGE, METHOD FOR MAKING SAME AND RESULTING PACKAGE

The present invention relates to sheets, which have been previously cut-out to define assemblies of sheet parts, said sheets being capable of assuming at least two first and second configurations, the first configuration called "flat", in which the sheets are substantially in one plane, and the second configuration called "folded", obtained after folding, around hinge means, sheet parts relative to one another to define a hollow volume, for example all or part of packaging for products, all or part of a furniture drawer, etc.

More especially, insofar as packaging of the crate type or similar is concerned, problems are known, posed particularly by the transportation of fruit, vegetables, etc., between the place of their production and the place of their distribution to the potential final client.

In fact, the fragility of these products necessitates their being transported in a manner so that they deteriorate or become crushed as little as possible in contact with one another. In this case, packaging intended to contain them for their transportation is of relatively small volume and, given the very large quantities of fruit, vegetables, etc., which are consumed daily, a considerable quantity of this packaging is necessary.

The management of this packaging poses enormous problems, more especially its transportation to the places of production and its destination after the products have been distributed. Thus, to reduce the volume of this packaging when it is empty, it has been produced from sheets, which have been previously cut-out to define assemblies of sheet parts which are capable of assuming at least two first and second configurations, the first configuration called "flat", in which the sheets are substantially in one plane, and the second configuration called "folded", obtained after folding, around hinge means, sheet parts relative to one another to define packaging of the crate type or similar.

In this manner, the packaging is brought, in its "flat" configuration, to the places which produce the products it is intended to contain to transport them, then folded to give it its configuration, which permits the products to be transported.

Once the products have been distributed, the packaging is unfolded to take up its flat configuration again and possibly re-used, as described above, when this is permitted.

In this manner, on the one hand the empty packaging takes up less space and, on the other hand, it may be used several times if necessary.

The sheets used to produce such packaging are, in the majority of cases, produced in multi-layer or alveolar cardboard. In this case, the hinge means are produced simply by folding the cardboard. However, packaging formed from cardboard sheets undoubtedly has a disadvantage, especially in the case of transporting products such as fruit or vegetables. Indeed, it is true that these previously cut-out sheets may be brought "flat" to the places where the products to be transported are produced, then folded to produce the packaging. However, the material used has poor mechanical resistance, which prevents large stacks of the packaging being made when the latter is loaded with products to be transported. In addition, packaging formed from cardboard does not have the aeration necessary for air circulation. Finally, as fruit and vegetables may produce juice, for example, during their transportation, these juices stain and impregnate the cardboard which thus deteriorates rapidly.

To overcome this disadvantage, packaging has been produced, for example, from box frames respectively covered with previously cut-out sheets formed from stacking two layers one on top of the other, one layer being formed from a sheet of flexible material, such as paper, cardboard, plastic, etc., the other layer being formed from a sheet of wood veneer. With such a production method, the hinge means are formed by an appropriate cut-out portion provided in the sheet of wood veneer, leaving the sheet of flexible material intact. Such a packaging sheet combined with the box frame is, for example, described in FR-A-2 779 089.

With such a packaging sheet, the fruit and vegetables could be put directly in contact with the sheet of wood veneer, and this permits the packaging to be better preserved during its service life than is packaging formed from cardboard. This type of packaging, however, still has at least the following disadvantages: on the one hand, the method of manufacturing the packaging box is not compatible with large scale industrial packaging production since its cost is too high and, on the other hand, the folding of the sheet parts being effected by means of the sheet of flexible material, this sheet is not protected from impacts or incidents of any kind which can destroy it relatively easily.

Thus, the object of the present invention is to provide a sheet, which has been previously cut-out to define an assembly of sheet parts, the sheet being capable of assuming at least two first and second configurations, the first configuration called "flat", in which the sheet is substantially in one plane, and the second configuration called "folded", obtained after folding, around hinge means, sheet parts relative to one another to define a hollow volume, for example all or part of packaging for products, all or part of a furniture drawer, etc., which overcomes to a large extent the disadvantages of the previously cut-out sheets of prior art for packaging or other purposes, more especially such as are described above.

More precisely, the present invention relates to a sheet, which has been previously cut-out to define an assembly of sheet parts, said sheet being capable of assuming at least two first and second configurations, the first configuration called "flat", in which said sheet is substantially in one plane, and the second configuration called "folded", obtained after folding, around hinge means, sheet parts relative to one another to define a hollow volume, for example all or part of packaging for products, characterised in that it is formed by stacking at least three layers on top of one another, respectively first, second and third layers, the second layer, situated between the first layer and the third layer, being a layer of flexible material, and at least the first of the two first and third layers being a relatively rigid layer of material.

According to one feature of the invention, the hinge means comprise at least one first groove provided along a fold line in at least the first of the two first and third layers.

According to another feature of the invention, the hinge means also comprise a second groove provided along said fold line in the third layer.

The invention also relates to a volume or packaging produced from at least one previously cut-out sheet according to the invention, characterised in that it comprises a detachable strap for maintaining said at least one sheet in the folded position.

The invention also relates to a method of manufacturing a sheet according to the invention, characterised in that it comprises the following steps:

stacking at least three layers on top of one another, respectively first, second and third layers, whilst providing therebetween a means for connecting the layers, the second layer, situated between the first layer and the third layer, being a layer of flexible material, and at least the first of the two first and third layers being a relatively rigid layer, and pressing the stacked mass, thus produced, between a first matrix and a second matrix, respectively in contact with said first and third layers, said first matrix at least comprising, on its contact surface with the first layer, a complementary male configuration of said at least one first groove, which is provided along a fold line in at least the first layer of the two first and third layers.

According to an advantageous feature of the method according to the invention, said second matrix comprises, on its contact surface with the third layer, a complementary male configuration of said second groove, which is provided along a fold line in the third layer.

Other features and advantages of the invention will appear in the course of the following description, given with reference to the accompanying drawings and by way of illustration, but in no way limitingly, in which.

Figure 1:
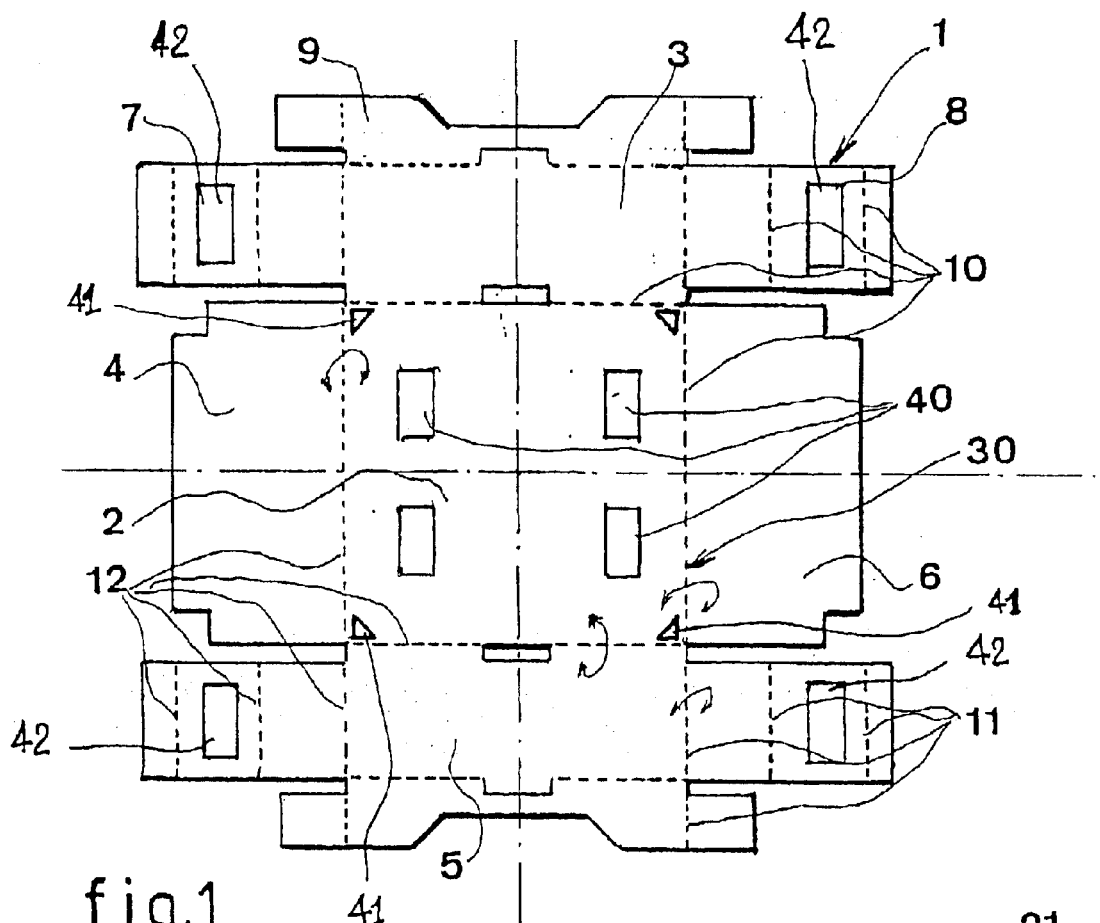
FIG. 1 illustrates an embodiment of a packaging sheet according to the invention, in its configuration called "flat"

It is specified that the seven Figures illustrate different embodiments of the packaging sheet according to the invention. However, the same reference numerals designate the same elements therein, whatever the Figure in which they appear and whatever the illustrated configuration of these elements. Similarly, if elements do not have specific reference numerals in one of the Figures, their reference numerals may easily be found by referring to another Figure.

It is also specified that when, according to the definition of the invention, the subject-matter of the invention comprises "at least one" element which has a given function, the embodiment described may comprise a plurality of these elements.

Similarly, if the embodiment of the subject-matter according to the invention, as it is illustrated, comprises a plurality of elements of identical function and if, in the description, it is not specified that the subject-matter according to this invention must, of necessity, comprise a particular number of these elements, the subject-matter of the invention will be able to be defined as comprising "at least one" of these elements.

The present invention relates to a sheet 1, which has been previously cut-out to define an assembly of sheet parts, the sheet being capable of assuming at least two first and second configurations, a first configuration called "flat" (FIG. 1) and a second configuration called "folded" (FIG. 2), obtained after folding, around hinge means 30, sheet parts relative to one another to define packaging of the crate type or the like, for the transportation of products such as fruit, vegetables or the like.

Figure 2:
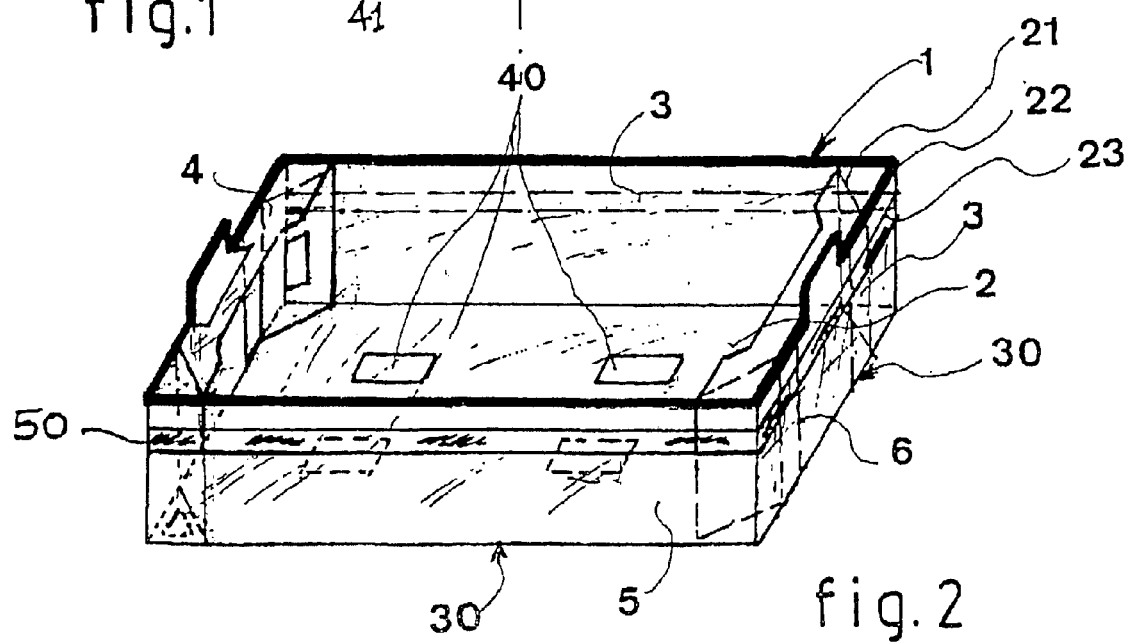
FIG. 2 illustrates the sheet according to FIG. 1, in its "folded" configuration to form packaging of the crate type for the transportation of fruit and vegetables.
Figure 3:
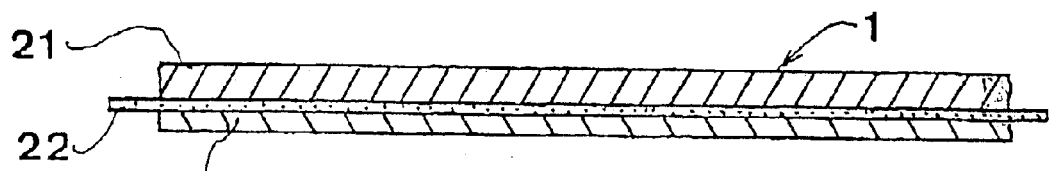
FIGS. 3 and 4 are cross-sectional views of the sheet according to the invention, respectively in two different embodiments.

In the embodiment illustrated in FIGS. 1 and 2, the sheet 1 comprises an assembly of sheet parts, the part 2 defining the base of the packaging, the parts 3, 4, 5 and 6 defining the sides thereof, other parts 7, 8, 9, etc., forming elements capable of being folded-back on the side parts to form, for example, corner reinforcements, gripping means, nesting means, etc.

To understand FIG. 1, more particularly, the broken lines, such as lines 10, 11, 12, etc., indicate the fold lines, that is to say the places where the sheet parts must be folded relative to one another to form packaging of the type schematically illustrated in FIG. 2, which is intended to contain products such as fruit, vegetables or the like, for their transportation to their distribution premises such as markets, supermarkets, retail shops, etc.

A packaging sheet 1, such as defined above, is substantially characterised in that it is formed by stacking at least three layers 21, 22, 23 on top of one another, respectively a first layer 21, a second layer 22 and a third layer 23, the second layer, situated between the first layer and the third layer, being a layer of flexible material, and at least the first of the two first and third layers being a relatively rigid layer.

In an advantageous embodiment, the three layers are glued onto one another to form a "glued laminate".

In an advantageous embodiment, the first relatively rigid layer 21 is produced in one of the following materials: plywood board, wood fibre board, wood sheet, reconstituted wood board, laminated board of wood particles agglomerated with or without a bonding agent, such as those sold under the trademark "Isorel".

The second layer 22 may be produced in any flexible material such as, for example, a sheet of plastic material or the like, preferably perforated and sufficiently resistant to be able to withstand a plurality of folds at the same locations without tearing or deteriorating.

Figure 7:
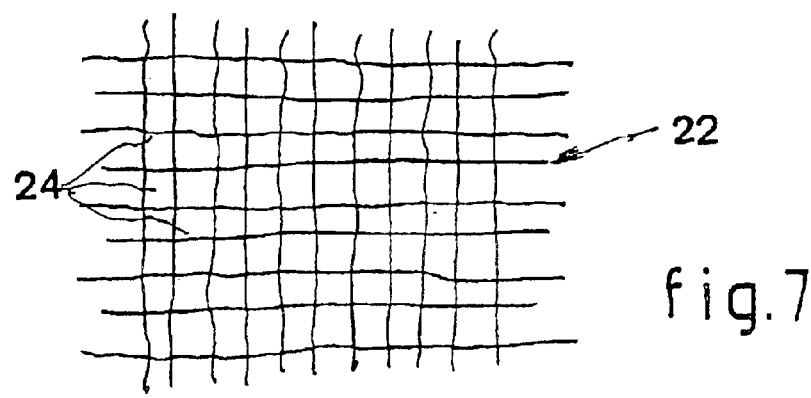
FIG. 7 schematically illustrates one of the elements involved in the formation of the packaging sheet according to the invention.

However, when the first layer 21 is produced in one of the materials specified above, it is advantageous that this second layer 22 is formed by at least one of the following textures; plait, threads, lattice, fibres, as schematically illustrated in FIG. 7, so as to form a multitude of openings 24 between its meshes to provide aeration of at least the first layer 21 and, as a consequence, a long service life.

As for the third layer 23, this is advantageously produced in one of the following materials: plywood board, wood fibre board, wood sheet, reconstituted wood board, laminated board of wood particles agglomerated with or without a bonding agent, paper, cardboard.

This embodiment of the third layer 23 is advantageous substantially for two reasons.

When it is produced in a material such as paper or cardboard, this third layer may include codes and/or trademark inscriptions, provenance, calibration, etc . . . In this case, the packaging has, at one and the same time, the advantages of crates formed from non-pliable wooden strips and of pliable crates formed from cardboard.

Of course, in this case, it is the first layer 21 which is suitable to form the internal wall of the packaging provided by the sheet when it is in its "folded" configuration, the wall which is in contact with the products to be transported.

When the third layer is produced in the other materials mentioned above, with wood as the raw material, the packaging is very solid, and has the advantages of any kind of crate or packaging produced in wooden strips with, in addition, the advantage of being pliable. It is therefore more solid, easily re-usable when this is permitted, and may easily include codes or inscriptions such as described above, printed on the external face of the cut-out portion in its position called "flat".

Of course, the person skilled in the art will have realised that the double function of hinging or folding the sheet parts, while ensuring the interconnection of these sheet parts, is permitted by the second flexible layer, situated between the two rigid layers, which remains the sole link, between these sheet parts, which comprises mechanical resistance qualities.

Figure 4:
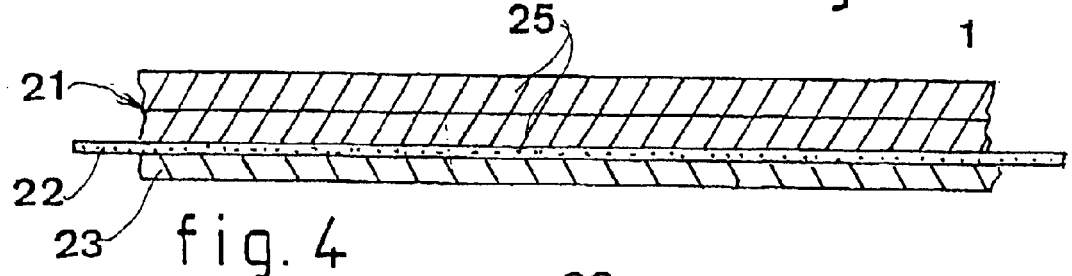

In FIG. 2, the sheet 1 comprises three layers 21, 22, 23. However, it is possible, as illustrated in FIG. 4, that at least one of these three layers, preferably the first layer 21, is a layer called "multi-layer" 25, for example produced in a plywood board, as indicated above.

Figure 5:
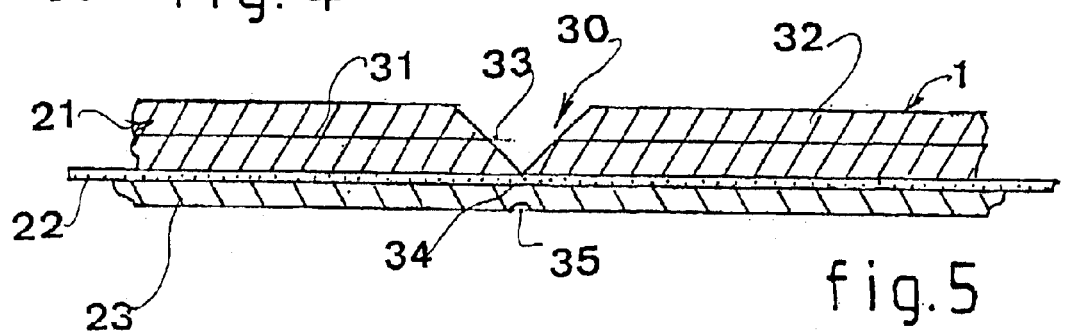
FIGS. 5 and 6 illustrate one embodiment of the hinge means on a sheet according to FIG. 4, respectively in its "flat" configuration (FIG. 5) and in its "folded" configuration (FIG. 6)
Figure 6:
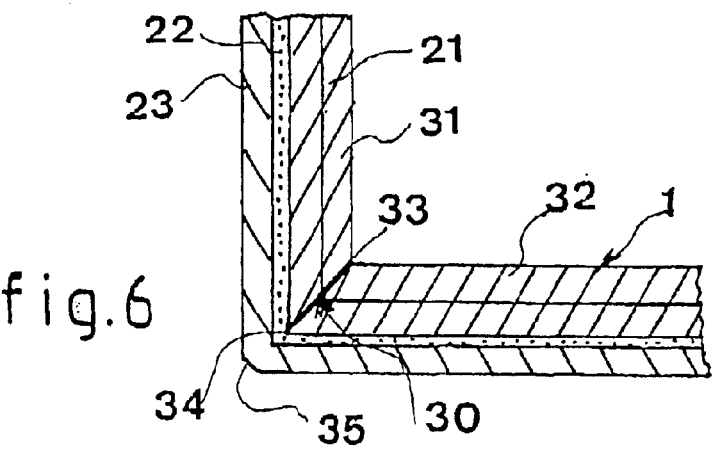

As previously mentioned, the packaging sheet 1 comprises hinge means 30 which permit sheet parts 2, 3, 4, . . . to be folded relative to one another. FIGS. 5 and 6 illustrate an embodiment of these hinge means 30 between the sheet parts 31, 32 which may all be parts 2, 3, 4, . . . defined previously.

These hinge means comprise at least one first groove 33 provided along a fold line 34, like the fold lines 10, 11, 12, . . . defined previously, in at least the first layer 21 of the two first layers 21 and third layers 23.

Advantageously, this first groove 33 has, when the sheet is in its "flat" form, a substantially "V" shaped cross-section. Moreover, its depth is, at the most, equal to the thickness of the first layer 21.

It is also preferable that the angle of the "V" is substantially equal to the fold angle which the two sheet parts 31, 32 form between each other when the sheet 1 is in its "folded" configuration. Thus, when the sheet is intended to be glued in the folded position, the glue may be placed in the "V" shaped groove, thereby permitting reinforced packaging to be produced.

To facilitate the folding of the two sheet parts 31, 32 relative to each other, depending on the nature of the third layer 23 and its thickness, it may be advantageous that the hinge means 30 also comprise a second groove 35 provided in this third layer, along the same fold line 34.

This second groove 35 may be formed by a single impress when the sheet is in its "flat" configuration, without the depth of this impress reaching the second layer 22, as illustrated in FIGS. 5 and 6. The impress may be produced by any appropriate means, depending on the material of the layer in which it is provided, for example by simple pressure, in the cold or in the hot, by means of a complementary male configuration which corresponds to the outline of the impress on the sheet in plywood.

The first groove 33 may also be formed by a single impress when the sheet is in its "flat" configuration, preferably produced by pressing in the hot if the thickness of the sheet requires it, by means of a complementary male configuration corresponding to the outline of the impress on the sheet. Thus, advantageously, the sheet according to the invention, provided with its grooves 33 and 35 on the first and third layers respectively, may be produced by an operation of hot pressing between two matrices, which respectively comprise, on their surface in contact with the layers of the sheet, the complementary male configurations of the grooves to be effected. The hot pressing will be able to be effected preferably at a temperature in the order of 120° C., and cold pressing will be possible for sheet thicknesses less than 2.5 mm ply. Hot pressing for thicknesses greater than 2.5 mm permits the shape of the grooves to be retained with certainty after the pressing.

Of course, to ensure ventilation in the volume of the packaging by convection currents, the sheet will comprise at least one opening 40, provided in one of the sheet parts such as the base part 2.

It will be noted that the corner reinforcements which can be produced by means of sheet parts 7 and 8 may additionally be used for circulating air inside these reinforcements and in the volume formed by the packaging, through appropriate openings 41, 42 in the sheet parts 7, 8, and the base 2.

To maintain the packaging in the folded position, as illustrated in FIG. 2, and in order to permit this packaging to be unfolded easily later, the use of a detachable strap 50, placed around the sides 3, 4, 5 and 6 in the folded position, will be perfectly appropriate, as illustrated in FIG. 2. In order to ensure that the sheet is maintained securely in the folded position, hence providing good rigidity for the packaging, the detachable strap will be formed, for example, from a material of the thermoretractable, plastics material type, which ensures that the sheet parts are clamped against one another.

However, in the case where the packaging does not have to be unfolded after it has been folded for the first time, for example, interconnection of the folded sheet parts by gluing or stapling may be envisaged. In this case, the packaging retains its advantage of being less cumbersome from the place of manufacture of the sheet to the place of folding, which may be carried out in the place where the packaging is used.

In the preceding description, a previously cut-out sheet has been proposed which forms, in one piece, the whole of the packaging to be produced. Although not illustrated, such packaging will be able to be produced from a plurality of distinct sheets, which have been previously cut-out according to the invention and will be able to be assembled together by gluing, for example, in order to reconstitute a sheet capable of assuming at least two first and second configurations, the first configuration called "flat", in which the sheets are substantially in one plane, and the second configuration called "folded", obtained after folding, around hinge means, sheet parts relative to one another to define a hollow volume, for example packaging for products, a furniture drawer, etc.

What is claimed is:

1. Sheet, which has been previously cut-out to define an assembly of sheet parts, said sheet (1) being capable of assuming at least two first and second configurations, the first configuration called flat, in which said sheet in its assembly is substantially in one plane, and the second configuration called folded, obtained after folding, around hinge means (30), sheet parts (2, 3, 4) relative to one another to define a hollow volume, wherein said sheet is a stack at least three layers (21, 22, 23) on top of one another, respectively first, second and third layers, the second layer (22), situated between the first layer (21) and the third layer (23), being a layer of flexible material, and the first layer being a relatively rigid layer, the first relatively rigid layer (21) being one of the following materials: plywood board, wood fibre board, wood sheet, reconstituted wood board, laminated board of wood particles agglomerated with or without a bonding agent, the hinge means (30) comprising a groove (33) provided along a fold line (34) in only the first (21) layer.

2. Sheet according to claim 1, characterised in that said second layer (22) is at least one of the following textures: plait, threads, lattice, fibres.

3. Sheet according to claim 1, characterised in that the third layer (23) is one of the following materials: plywood board, wood fibre board, wood sheet, reconstituted wood board, laminated board of wood particles agglomerated with or without a bonding agent, paper, cardboard.

4. Sheet according to claim 1, characterised in that the groove (33) has a substantially V shaped cross-section.

5. Sheet according to claim 1, characterised in that the depth of the groove is, at the most, equal to the thickness of the first layer.

6. Sheet according to claim 4, characterised in that the angle of the V is substantially equal to the fold angle which the two sheet parts (31, 32) form between each other when the sheet is in its folded configuration.

7. Sheet according to claim 1, characterised in that the hinge means (30) also comprise a second groove (35) provided along said fold line (34) in the third layer (23).

8. Sheet according to claim 1, characterised in that it comprises at least one opening (40), provided in at least one (2) of the sheet parts, to ensure ventilation in the volume of said packaging by convention currents.

9. Sheet according to claim 1, characterised in that said three layers (21, 22, 23) are glued onto one another to form a glued laminate.

10. Sheet according to claim 1, characterised in that the first layer is a multi-layer layer.

11. Sheet according to claim 1, characterised in that said first layer (21) is capable of forming the internal wall of said packaging formed by said sheet (1) when it is in its folded configuration.

12. Packaging or volume produced from at least one previously cut-out sheet according to claim 1, characterised in that it comprises a detachable strap (50) for maintaining said at least one sheet in the folded position.

13. Method of manufacturing a sheet, comprising the following steps:

stacking at least three layers (21, 22, 23) on top of one another, respectively first, second and third layers, whilst providing therebetween a means for connecting the layers, the second layer (22), situated between the first layer (21) and the third layer (23), being a layer of flexible material, and at least the first of the two first and third layers being a relatively rigid layer, and pressing the stacked mass, thus produced, between a first matrix and a second matrix, respectively in contact with said first and third layers, said first matrix at least comprising, on its contact surface with the first layer, a male configuration to produce a groove (33) along a fold line (34) in the first layer (21) of the two first and third layers.

14. Manufacturing method for manufacturing a sheet according to claim 13, characterised in that said second matrix comprises, on its contact surface with the third layer, a complementary male configuration of a second groove (35), which is provided along a fold line (34) in the third layer (23).

15. Manufacturing method according to claim 13, characterised in that the pressing is carried out hot.

* * * * *